(No Model.) 2 Sheets—Sheet 1.

W. H. RATCLIFF.
RIM FOR WHEELS.

No. 510,189. Patented Dec. 5, 1893.

Witnesses
Oscar A. Michel
Jas. S. Baldwin

Inventor:
William H. Ratcliff,
By Drake & Co. Atty's.

THE NATIONAL LITHOGRAPHING COMPANY,
WASHINGTON, D. C.

(No Model.) 2 Sheets—Sheet 2.

W. H. RATCLIFF.
RIM FOR WHEELS.

No. 510,189. Patented Dec. 5, 1893.

Witnesses
Robert Sollberger
Oscar Anderson

Inventor
William H. Ratcliff
By Drake & Co., Atty's

UNITED STATES PATENT OFFICE.

WILLIAM H. RATCLIFF, OF ORANGE, NEW JERSEY.

RIM FOR WHEELS.

SPECIFICATION forming part of Letters Patent No. 510,189, dated December 5, 1893.

Application filed November 5, 1892. Serial No. 451,129. (No model.)

*To all whom it may concern:*

Be it known that I, WILLIAM H. RATCLIFF, a subject of the Queen of Great Britain, and a resident of the city of Orange, in the State of New Jersey, have invented a new and useful Improvement in Rims for Bicycles and other Vehicles, of which the following is a specification.

The objects of this invention are to provide a bicycle wheel or a wheel for pneumatic tires of increased strength and durability and yet of reduced weight, to enable the wheel to more perfectly withstand a sudden strain at the joint when the wheel is rolled over a curb or brought with force into contact with other similar obstructions, to maintain, at a given expenditure of metal, a more perfect rotundity in the wheel, to prevent weakening of the wheel in applying the valve for inflating the pneumatic tire, and to secure other advantages and results some of which will be referred to in connection with the description of the working parts.

The invention consists in the improved wheel, the improved rim or felly therefor, and in the arrangements and combinations of parts, all substantially as will be hereinafter set forth and finally embraced in the clauses of the claim.

Figure 1:
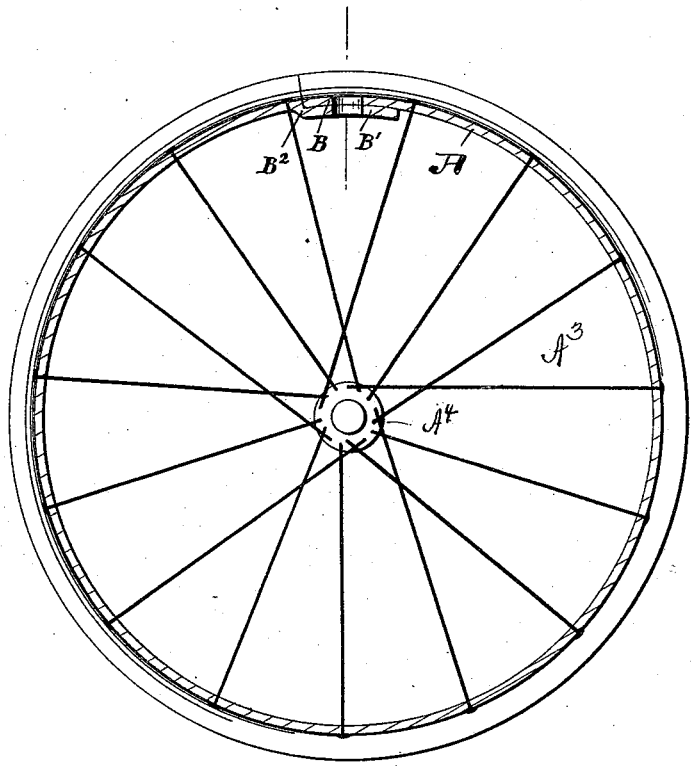
Figure 2:
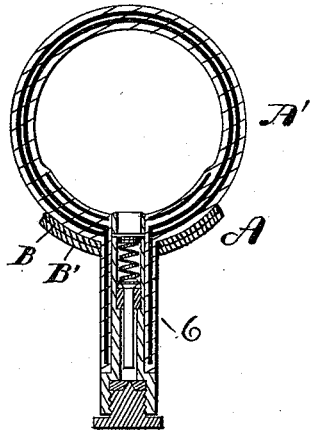
Figure 3:
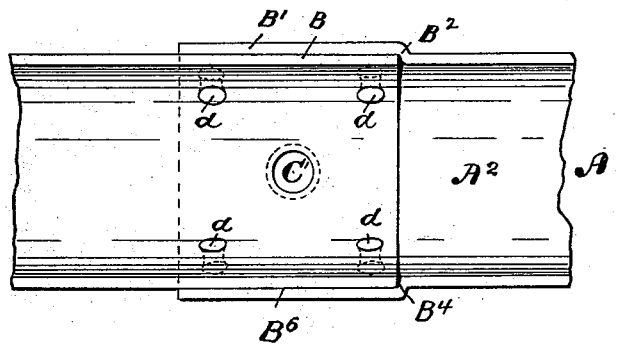

Referring to the accompanying drawings, in which like letters indicate corresponding parts in each of the figures, Figure 1 is a section of a wheel taken through the center plane of the rim and devoid of the pneumatic tire and valve. Fig. 2 is a transverse section taken through the center of said valve. Fig. 3 is a plan of a portion of the rim showing clearly the relation of the valve perforation and rivets to the radial joint and to one another, and Fig. 4 is a section of a portion of the wheel, the section line being taken at one side of and parallel with the center plane, as at line $y$, Fig. 3.

In said drawings, A indicates the annular and outwardly concavous rim which when provided with a tire, spokes and hub is adapted to roll over the ground. The metal of the rim, at its opposite ends B, B', overlaps as indicated in Figs. 1, 3, 4.

Figure 4:
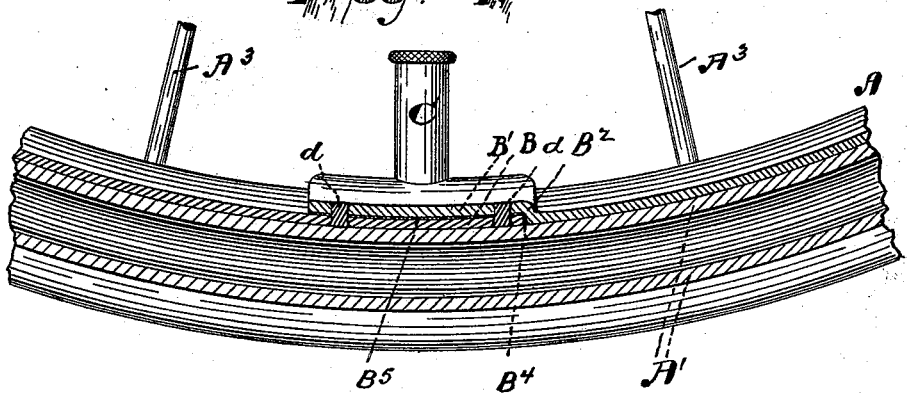

A', Figs. 2, 4, indicates the pneumatic tire, arranged in the continuous groove, $A^2$, formed by the concavous and annular rim, and $A^3$, indicates the ordinary spokes uniting the rim to a central hub $A^4$.

The rim, A, is of rolled sheet metal of the lightest weight consistent with the strength required to sustain the rider and resist the forces brought to bear in ordinary riding, such lightness being desired to reduce the load to be moved by the rider. Heretofore, rims of this class, while sufficiently strong for the most part were weak at the union of the ends and thus the wheel was apt to be bent inward at such union and the motion of the wheel thus rendered uneven or irregular, and the rim, furthermore, was rendered more weak, in many cases, by the coincidence of the valve perforation with the radial portion of the joint. To avoid such weakness and to secure a more regular rotation of the wheel over the ground, and all without increasing the weight of the rim, I have given the rim the peculiar construction, at the union which I will now describe. The male lap, B, of the rim, is uniform in thickness and continuous in both the annular and transverse curves with the body of the rim and the expense of scarfing is thus saved. The female lap B' is depressed and forms a shallow socket to receive the male lap and hold the same so that its interior face will lie flush with the interior of the opposite raised surfaces and form therewith an even annular seat for the tire. Back from its extremity, the depressed end of the rim is transversely bent, as at $B^2$, from edge to edge, the bend extending radially or lying in one of the radii of the wheel and thus presenting a thick body of metal adapted to resist the inward pressure brought to bear as the wheel rolls and compensates for the weakness due to the radial joint, $B^4$, at the side of the same and where the wheel, if it were not for said radial bend, would be least able to resist said inward pressure or the tension of the spokes. This radial bend is, also, in its transverse extension, arched or curved and is thus capable of resisting successfully a great pressure due to the outside or exposed edge of the rim striking an obstruction when rolling over the ground. The lapped metal at the ends is curved in lines concentric with the annular curve of the rim and thus the strength due to arching the metal to resist inward pressure is maintained at the joint. The laps B, B', are united permanently and inseparably first by riveting, the rivets d, d, being disposed at the four corners of the two-ply part and away from the center thereof as shown in Fig. 3. After riveting, said laps are more securely united by brazing metal $B^5$, Fig. 4, which enters the joint and rigidly and inseparably unites the parts. At the center of the two-ply part of the rim, the two laps are perforated, as at C', at a distance from the radial portion of the joint so as not to impair the strength of the radial bend adjacent to said radial joint, or to weaken the rim by having the said perforation and transverse radial joint coincide. The said perforation C', in the two-ply metal provides a passage for the pneumatic valve, C, and the walls of said perforation, a thick and substantial bearing for said valve, so that the latter may be secured in place with firmness. The annularly and transversely curved walls of the socket, for the male end of the outwardly grooved or open rim serve as bearings at the lateral parts which serve in holding the rim into its proper plane and when brazed, the outwardly turned sides, between which the pneumatic cushion tire is inserted, co-operate with the brazing metal in preventing lateral distortion. The rigidly united and inseparable ends of the outwardly concavous piece formed as described provide a smooth or regular seat for the annular tire of increased strength without increasing the weight of the wheel, thus rendering the wheel peculiarly adapted and suited for velocipede purposes.

Having thus described the invention, what I claim as new is—

1. The sheet metal rim for pneumatic tires for velocipedes, consisting of an outwardly concavous and annular piece adapted to receive the annular cushion tire, one end of which piece is uniform in its annular and transverse lines with the body portion of the rim and the opposite end is depressed to a thickness equal to that of the first said end and is curved annularly and transversely in correspondence with the curves thereof, said ends being permanently united and inseparable, substantially as set forth.

2. The improved velocipede wheel herein described comprising a hub, spokes, rim and tire, the rim consisting of a single integral piece of metal bent into annular form and transversely bent to form an outward concavous groove in which said tire is seated, one end of said rim piece being depressed from edge to edge back from the extremity and forming a shallow socket for the male end, the metal at the bend extending radially and being transversely curved and compensating for the weakness of the transverse and radial joint in resisting the contracting force of the tire, said parts being arranged and operating in combination substantially as set forth.

3. The improved rim for a velocipede wheel, comprising an annular and outwardly concavous piece, one end of which is depressed to form a socket to receive the opposite end, the radial bend being also transversely curved and extending from edge to edge of the rim, said ends being permanently and inseparably united substantially as set forth.

4. The improved velocipede wheel comprising the hub, spokes, rim and pneumatic tire, and valve, the said rim having one end depressed and lapped and permanently brazed and riveted to the other, and the lapped two-ply metal being centrally perforated back from the radial joint at the extremity of the male lap and the pneumatic valve being seated in the perforation, said parts being combined substantially as set forth.

5. In a wheel for pneumatic tires, the combination with the rim having overlapping ends permanently brazed one against the other, the said ends being both coincidingly perforated back from the extremities thereof, of a valve seated in said perforations, substantially as set forth.

In testimony that I claim the foregoing as my invention I have signed my name, in presence of two witnesses, this 5th day of October, 1892.

WILLIAM H. RATCLIFF.

Witnesses:
GEO. P. KINGSLEY,
CHAS. E. HATHAWAY.